United States Patent
Taniguchi et al.

(10) Patent No.: US 11,161,328 B2
(45) Date of Patent: *Nov. 2, 2021

(54) PROCESS FOR PRODUCING LAMINATED FOAM SHEET AND EXTRUDED LAMINATED FOAM SHEET

(71) Applicant: JSP CORPORATION, Tokyo (JP)

(72) Inventors: Ryuichi Taniguchi, Tochigi (JP); Hirotoshi Kakuta, Utsunomiya (JP); Takashi Ori, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,609

(22) Filed: Jan. 13, 2020

(65) Prior Publication Data

US 2020/0247094 A1 Aug. 6, 2020

(30) Foreign Application Priority Data

Feb. 4, 2019 (JP) .............................. JP2019-018039
May 28, 2019 (JP) .............................. JP2019-099688

(51) Int. Cl.
| | |
|---|---|
| *B32B 27/06* | (2006.01) |
| *B32B 5/18* | (2006.01) |
| *B32B 27/32* | (2006.01) |
| *B29C 48/00* | (2019.01) |
| *B29C 48/07* | (2019.01) |
| *B29C 48/21* | (2019.01) |
| *B29L 7/00* | (2006.01) |
| *B29L 9/00* | (2006.01) |

(52) U.S. Cl.
CPC ........ *B32B 27/065* (2013.01); *B29C 48/0012* (2019.02); *B29C 48/022* (2019.02); *B29C 48/07* (2019.02); *B29C 48/21* (2019.02); *B32B 5/18* (2013.01); *B32B 27/32* (2013.01); *B29K 2023/06* (2013.01); *B29L 2007/002* (2013.01); *B29L 2009/00* (2013.01); *B32B 2250/02* (2013.01); *B32B 2266/025* (2013.01)

(58) Field of Classification Search
CPC ............... B32B 5/18–5/22; B32B 5/32; B32B 27/32–27/327; C08J 2203/14; C08J 2203/18–2203/184
See application file for complete search history.

(56) References Cited

U.S. PATENT DOCUMENTS

| | | | |
|---|---|---|---|
| 2016/0311202 A1 | 10/2016 | Aoki et al. | |
| 2017/0066224 A1* | 3/2017 | Aoki | .......................... B32B 5/18 |
| 2018/0051154 A1* | 2/2018 | Aoki | ........................ B32B 27/18 |

FOREIGN PATENT DOCUMENTS

| | | | | |
|---|---|---|---|---|
| JP | 2016204227 A | 12/2016 | | |
| WO | WO-2016152910 A1 * | 9/2016 | .............. C08L 23/06 |

* cited by examiner

*Primary Examiner* — Prashant J Khatri
(74) *Attorney, Agent, or Firm* — Bacon & Thomas, PLLC

(57) ABSTRACT

A laminated foam sheet having a polyethylene resin foam layer and an antistatic polyethylene layer laminated on one or both sides thereof is produced by coextruding melts for respective layers, wherein the melt for the antistatic layer contains a polyethylene resin, an ionomer resin antistatic agent and a specific amount of volatile plasticizer blend containing an alcohol and a saturated hydrocarbon or a dialkyl ether. The antistatic layer of the obtained laminated foam sheet has specific morphology.

6 Claims, 3 Drawing Sheets

— 1 —

PROCESS FOR PRODUCING LAMINATED FOAM SHEET AND EXTRUDED LAMINATED FOAM SHEET

BACKGROUND OF THE INVENTION

The present invention relates to a process for producing a laminated foam sheet and to an extruded, antistatic laminated foam sheet.

A polyethylene-based resin foam sheet, which is soft and flexible and has good cushioning property, is now widely used as, for example, an interleaf sheet for being inserted between glass plates, such as liquid crystal panels, and a cushioning or packaging material for electronic devices. Because such a foam sheet is apt to generate static electricity and cause dust deposition problems, antistatic property must be imparted thereto. To cope with the above problem, Japanese patent publication No. JP-A-2016-204227 proposes a method for producing a laminated foam sheet, in which a melt for forming a foam layer and a melt for forming a resin layer containing a polymeric antistatic agent are coextruded to obtain the laminated foam sheet having a foam layer overlaid with an antistatic resin layer.

For being used as an interleaf sheet for glasses and the like applications, there is a strong demand for a laminated foam sheet which shows much improved property to prevent an article to be packaged or wrapped with the sheet from being stained with low molecular matters contained therein. Thus, as the polymeric antistatic agent, the use of an ionomer resin which is relatively low in low molecular weight matter content is proposed.

It has been found by the present inventors that the lamination of an ionomer-containing polyethylene resin layer on a polyethylene resin foam layer by a coextrusion lamination method encounters a difficulty in developing the desired antistatic properties in a stable manner.

The present invention is aimed at provision of a process for producing laminated foam sheet capable of producing, by a coextrusion lamination method, a laminated foam sheet having the desired antistatic properties using an ionomer resin as a polymeric antistatic agent. The present invention is also aimed at provision of a novel laminated foam sheet which shows excellent antistatic property and yet has excellent property to prevent an article to be packaged or wrapped with the sheet from being stained with low molecular matters contained in the sheet.

SUMMARY OF THE INVENTION

In accordance with one aspect of the present invention there are provided the following processes:

[1] A process for producing a laminated foam sheet having a polyethylene-based resin foam layer and a polyethylene-based resin antistatic layer laminated on at least one side of the foam layer, comprising the steps of:

providing a first melt containing a polyethylene-based resin (PE-1) and a physical blowing agent, providing a second melt containing a polyethylene-based resin (PE-2), an ionomer resin as a polymeric antistatic agent and a volatile plasticizer, and coextruding the first and second melts to form the laminated foam sheet in which the polyethylene-based resin foam layer and the polyethylene-based resin antistatic layer are formed from the first and second melts, respectively, wherein the volatile plasticizer is composed of a blend of a component (A) which is at least one alcohol having a boiling point of 120° C. or less and a component (B) which is at least one selected from the group consisting of saturated hydrocarbons having 3 to 5 carbon atoms and dialkyl ethers in which each alkyl has 1 to 3 carbon atoms, wherein a molar ratio of the component (A) to the component (B) is 5:95 to 95:5, and wherein the volatile plasticizer is present in the second melt in an amount of 0.1 to 10 mols per kg of the total weight of the polyethylene-based resin (PE-2) and the ionomer resin.

[2] The process according to above [1], wherein the ionomer resin is present in the second melt in an amount of 1 to 80% by weight based on the total weight of the polyethylene-based resin (PE-2) and the ionomer resin.

[3] The process according to above [1] or [2], wherein the component (A) contains ethanol in an amount of 50% by weight or more based on the weight of the component (A).

[4] The process according to any one of above [1] to [3], wherein the component (A) is present in the second melt in an amount of 1 to 25 mols per kg of the ionomer resin.

[5] The process according to any one of above [1] to [4], wherein the ionomer resin has a melt flow rate of 3 g/10 min or less at a temperature of 190° C. and a load of 2.16 kg.

[6] The process according to any one of above [1] to [5], wherein the polyethylene-based resin (PE-2) has a melt flow rate of 1 to 20 g/10 min at a temperature of 190° C. and a load of 2.16 kg.

[7] The process according to any one of above [1] to [6], wherein the laminated foam sheet has an apparent density of 20 to 200 kg/m$^3$.

In another aspect, the present invention provides the following laminated foam sheets:

[8] An extruded laminated foam sheet comprising a polyethylene-based resin foam layer, and a polyethylene-based resin antistatic layer which is laminated on at least one side of the foam layer and which contains a polyethylene-based resin (PE-2) and an ionomer resin as a polymeric antistatic agent, wherein the polyethylene-based resin (PE-2) forms a continuous phase, and the ionomer resin forms dispersed phases dispersed in the continuous phase, and wherein, on a vertical cross-section of the antistatic layer, which is taken along the extrusion direction of the laminated foam sheet, a number-based median value $S_{50}$ of cross-sectional areas of the dispersed phases is $1 \times 10^2$ to $1 \times 10^6$ nm$^2$ and a ratio $LM_{50}/LT_{50}$ of a number-based median value $LM_{50}$ of diameters in the extrusion direction of the dispersed phases to a number-based median value $LT_{50}$ of diameters in the thickness direction of the dispersed phases is 2 or more.

[9] The extruded laminated foam sheet according to above [8], wherein, on the vertical cross-section of the antistatic layer taken along the extrusion direction of the laminated foam sheet, an average number NT of the dispersion phases that intersect a vertical line segment extending between both sides of the antistatic layer is 1 or more.

[10] The extruded laminated foam sheet according to above [8] or [9], wherein the antistatic layer has a surface resistivity of $1 \times 10^{12}$ c or less.

BRIEF DESCRIPTION OF THE DRAWINGS

Other objects, features and advantages of the present invention will become apparent from the detailed description of the preferred embodiments of the invention which follows, when considered in light of the accompanying drawings in which.

DETAILED DESCRIPTION OF THE INVENTION

Figure 1:
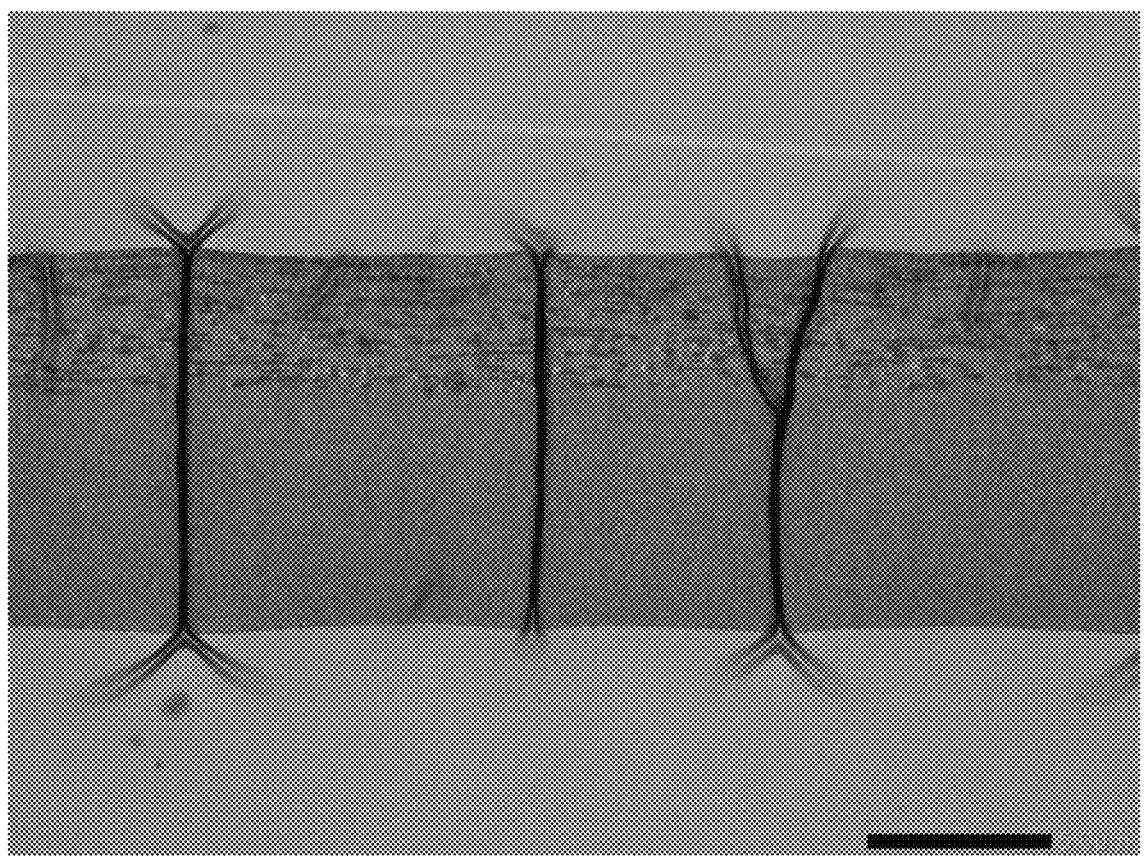
FIG. 1 is a transmission electron photomicrograph (at magnification of 7,000) of a vertical cross-section of an antistatic layer taken along the extrusion direction of an extruded laminated foam sheet obtained in Example 9.

A method for producing a laminated foam sheet according to the present invention includes a step of providing a first melt containing a polyethylene-based resin (PE-1) and a physical blowing agent, and a step of providing a second melt containing a polyethylene-based resin (PE-2), an ionomer resin (which serves as a polymeric antistatic agent) and a volatile plasticizer. The first and second melts are then coextruded to form the laminated foam sheet in which the first melt forms a polyethylene-based resin foam layer and the second melt forms an antistatic layer that is provided on at least one side of the foam layer.

More particularly, the polyethylene-based resin PE-1 is fed to an extruder and heated and kneaded, into which a physical blowing agent is injected. The resulting mixture is further kneaded to obtain the first melt for forming the foam layer. At the same time, the polyethylene-based resin PE-2 and the ionomer resin polymeric antistatic agent are fed to another extruder and heated and kneaded, to which the volatile plasticizer is injected. The resulting mixture is further kneaded to obtain the second melt for forming the antistatic layer. The thus obtained first and second melts are fed to a coextrusion die and coextruded therethrough into a lower pressure environment (generally into the atmosphere) and allowed to expand. It is without saying that when the antistatic layer is laminated on both sides of the foam layer and when the two antistatic layers respectively differ in composition from each other, it is necessary to use different kinds of melts for forming the different antistatic layers.

The polyethylene-based resin (PE-1) used in the first melt for forming the foam layer is described next. The polyethylene-based resin (PE-1) may be, for example, low-density polyethylene, very low-density polyethylene, linear low-density polyethylene, high-density polyethylene, an ethylene-vinyl acetate copolymer, an ethylene-methyl methacrylate copolymer, an ethylene-ethyl acrylate copolymer, an ethylene-butyl acrylate copolymer and mixtures of two or more of these ethylenic polymers and copolymers.

It is preferred that the polyethylene-based resin (PE-1) contains low-density polyethylene in an amount of 50% by weight or more, more preferably 60% by weight or more, still more preferably 80% by weight or more, particularly preferably 90% by weight or more. The low-density polyethylene is an ethylenic polymer having a density of 910 kg/m$^3$ or higher and lower than 930 kg/m$^3$.

If desired, the polyethylene-based resin (PE-1) may contain one or more additional polymers such as thermoplastic elastomers and thermoplastic resins other than the ethylenic polymer. Such an additional polymer is preferably used in an amount of 20% by weight or less, more preferably 10% by weight or less, based on the weight of the polyethylene-based resin (PE-1). The polyethylene-based resin (PE-1) is preferably substantially free of such an additional polymer.

It is preferred that the polyethylene-based resin (PE-1) has a melt flow rate (MFR) of 0.5 g/10 min to 15 g/10 min from the standpoint of extrusion foamability. As used herein MFR is as measured according to JIS K7210-1(2014) at a temperature of 190° C. and a load of 2.16 kg.

It is also preferred that the polyethylene-based resin (PE-1) has a melting point (Tmp1) of 100 to 135° C., more preferably 100 to 130° C., still more preferably 100 to 120° C., particularly preferably 100 to 115° C., for reasons of good extrusion foaming property and capability of forming a foam layer with excellent cushioning property.

The melting point (Tmp1) is as measured by heat flux differential scanning calorimeter measurement according to JIS K7121 (1987). More specifically, the melting point is measured with a heating rate of 10° C./min after the test piece has been subjected to a conditioning treatment according to "3. Conditioning of Test Samples (2)" (cooling rate is 10° C./min) of JIS K7121 (1987). The peak top temperature of the measured fusion peak is the melting point (Tmp1). When there are two or more fusion peaks in the DSC curve, the peak top temperature of the fusion peak that has the largest area is the melting point (Tmp1).

The first melt for forming the foam layer may contain, in addition to the polyethylene-based resin (PE-1), one or more additives such as a cell controlling agent, a nucleating agent, an antioxidant, a heat stabilizer, a weathering stabilizer, a UV absorbing agent, a flame retardant, an antibacterial agent, a shrinkage preventing agent and an inorganic filler.

Description will be next made of the polyethylene-based resin (PE-2) and ionomer resin contained in the second melt for forming the antistatic layer. The polyethylene-based resin (PE-2) may be selected from the ethylenic polymers described above in connection with the polyethylene-based resin (PE-1) and preferably contains low-density polyethylene in an amount of 50% by weight or more, more preferably 60% by weight or more, still more preferably 80% by weight or more, particularly preferably 90% by weight or more from the standpoint of softness and flexibility. It is preferred that the same kind of an ethylenic polymer is used for the polyethylene-based resins (PE-1) and (PE-2) for reasons of tight bonding between the foam layer and the antistatic layer.

The polyethylene-based resin (PE-2) may contain one or more additional resins such as thermoplastic resins other than ethylenic polymer. Such an additional resin is preferably added in an amount of 20% by weight or less, more preferably 10% by weight or less, based on the total weight of the polyethylene-based resin (PE-2) and a hereinafter described ionomer resin. However, it is preferred that the polyethylene-based resin (PE-2) is substantially free of a polystyrene-based resin such as general-use polystyrene, rubber-modified polystyrene (impact resistant polystyrene) and copolymers of styrene and a copolymerizable vinyl monomer, for reasons of improved cushioning property and recyclability of the laminated foam sheet. The content of such a styrene-based resin in the second melt should be less than 5% by weight, preferably 3% by weight or less, particularly preferably zero, based on the total weight of the polyethylene-based resin (PE-2) and a hereinafter described ionomer resin.

In the process of the present invention an ionomer resin is used as a polymeric antistatic agent. Such an ionomer resin used as an antistatic ionomer resin will be simply referred to as "ionomer resin". The ionomer resin is a polymer containing interchain ionic bonding and may be obtained by copolymerizing ethylene and an unsaturated carboxylic acid, followed by neutralization by metal cations. Examples of the unsaturated carboxylic acid include acrylic acid, methacrylic acid and maleic acid. Examples of the metal cation include lithium, sodium, potassium and calcium. A potassium-containing ionomer resin is particularly preferred. The ionomer resin has a low surface resistivity and is able to impart desired antistatic properties to the laminated foam sheet. Further, since the ionomer resin is low in content of low molecular weight matters, an article which is brought into direct contact with the ionomer-containing laminated foam sheet is prevented from causing surface staining attributed to transference of low molecular matters from the laminated foam sheet.

The ionomer resin preferably has a surface resistivity of $1 \times 10^{12} \Omega$ or less for reasons that a laminated foam sheet having desired antistatic properties may be obtained in a stable manner. For this reason, the surface resistivity of the ionomer resin is more preferably $1 \times 10^{11} \Omega$ or less, still more preferably $1 \times 10^{10} \Omega$ or less, particularly preferably $1 \times 10^{9} \Omega$ or less. The surface resistivity is as measured according to JIS K6271(2001). In this case, the ionomer resin is heat-pressed at a temperature of 200° C. to form a sheet having a thickness of about 0.1 mm. From the obtained sheet, a test piece is cut out and measured for the surface resistivity of the ionomer resin.

The ionomer resin preferably has a melt flow rate $MFR_I$ of 10 g/10 min or less, more preferably 7 g/10 min or less, still more preferably 3 g/10 min, at a temperature of 190° C. and a load of 2.16 kg for reasons that low molecular weight matters that may be contained in the ionomer resin show less tendency to transfer from the laminated foam sheet to an article to be contacted therewith. The lower limit of $MFR_I$ is about 1 g/10 min.

The polyethylene-based resin (PE-2) preferably has a melt flow rate $MFR_E$ of 1 g/10 min to 20 g/10 min, more preferably 5 g/10 min to 15 g/10 min, at a temperature of 190° C. and a load of 2.16 kg, for reasons that the antistatic layer may be formed by the coextrusion lamination method in a stable manner. It is preferred that the melt flow rate $MFR_E$ of the polyethylene-based resin (PE-2) is the same as or greater than that of the polyethylene-based resin (PE-1) of the foam layer.

It is preferred that a difference ($MFR_E$-$MFR_I$) between the melt flow rate $MFR_E$ of the polyethylene-based resin (PE-2) and $MFR_I$ of the ionomer resin is 5 to 20 g/10 min, more preferably 6 to 15 g/10 min, particularly preferably 6 to 12 g/10 min, from the standpoint of dispersibility of the ionomer resin in the antistatic layer. Whilst an increase of the difference ($MFR_E$-$MFR_I$) generally causes a difficulty in coextrusion when the coextrusion temperature is made low to form a suitable foam layer, the process of the present invention, in which, as described hereinafter, a specific volatile plasticizer is incorporated into the second melt for forming the antistatic layer, can easily produce a laminated foam sheet having excellent antistatic properties in a stable manner even when the difference ($MFR_E$-$MFR_I$) is within the above range.

The polyethylene-based resin (PE-2) preferably has a melting point of 100 to 135° C., more preferably 100 to 130° C., still more preferably 100 to 120° C., particularly preferably 100 to 115° C., for reasons that a desired lamination is attained between the foam layer and the antistatic layer, the antistatic layer becomes homogeneous and the laminated foam sheet shows uniform antistatic properties throughout the whole surfaces.

It is preferred that a difference (Tmp-Tmi) between a melting point Tmp of the polyethylene-based resin (PE-2) and a melting point Tmi of the ionomer is 5 to 45° C. When the difference (Tmp-Tmi) falls within the above range and when, as described hereinafter, a specific volatile plasticizer is incorporated into the second melt for forming the antistatic layer, the ionomer resin can be easily and properly dispersed in a matrix of the polyethylene-based resin (PE-2), even when the melting point of the polyethylene-based resin (PE-1) is made low for the purpose of forming a suitable foam layer and, additionally, even when the melting point of the polyethylene-based resin (PE-2) is made low so as to match with the melting point of the foam layer. From this standpoint, the difference (Tmp-Tmi) is more preferably 8 to 35° C., still more preferably 10 to 30° C., particularly preferably 10 to 25° C. The melting point Tmi of the ionomer is preferably about 80 to 110° C., more preferably 85 to 100° C.

The melting points Tmp and Tmi are as measured by heat flux differential scanning calorimeter measurement according to JIS K7121 (1987) in the same manner as described previously in connection with the polyethylene-based resin (PE-1).

Specific examples of the ionomer resin include those available from duPont-Mitsui Polychemicals Co., Ltd. under the trade names of "ENTIRA SD100" and "ENTIRA MK400".

The ionomer resin is preferably contained in the second melt for forming the antistatic layer in an amount of 1 to 80% by weight based on the total weight (100% by weight) of the polyethylene-based resin (PE-2) and the ionomer resin for reasons that a laminated foam sheet obtained has excellent flexibility and shows desired antistatic properties. From this stand point, the lower limit of the amount of the ionomer resin is more preferably 5% by weight, still preferably 8% by weight, particularly preferably 10% by weight, while the upper limit thereof is more preferably 60% by weight, still more preferably 50% by weight, yet still more preferably 30% by weight, particularly preferably 20% by weight.

Description will be next made of the volatile plasticizer contained, together with the polyethylene-based resin (PE-2) and the ionomer, in the second melt for forming the antistatic layer. The volatile plasticizer is composed of a blend of a component (A) which is at least one alcohol having a boiling point of 120° C. or less and a component (B) which is at least one selected from the group consisting of saturated hydrocarbons having 3 to 5 carbon atoms and dialkyl ethers in which each alkyl has 1 to 3 carbon atoms.

Because of the presence of the specific volatile plasticizer in the second melt for forming the ionomer-containing antistatic layer, the process of the present invention allows lamination of the foam layer and the antistatic layer in a stable manner. Although not wishing to be bound by the theory, it is inferred that the above effect is achieved by the following mechanism.

The ionomer resin is a polymer having a pseudo-cross-linked structure in which metal cations and carboxylic acid groups are ionically bound. The melt viscosity of the ionomer resin is greatly influenced by temperature. At a high temperature, the melt viscosity of the molten ionomer resin decreases. When the temperature of the molten ionomer resin is lowered to a level where the formation of the foam layer by expansion and foaming occur in a desired state, the melt viscosity of the ionomer resin increases.

In the coextrusion lamination of an ionomer resin-containing polyethylene resin layer and a foam layer, it is essential that the melt for forming the foam layer should be adjusted to a coextrusion temperature at which the foaming of the melt appropriately proceeds. It follows that the temperature of the ionomer resin-containing melt is lowered and the melt viscosity of the ionomer resin increases. As a consequence, the ionomer resin fails to be easily dispersed in the polyethylene resin matrix. Namely, it has been hitherto difficult to produce the laminated foam sheet having desired antistatic properties in a stable manner. This becomes especially remarkable when the ionomer resin has a low melt flow rate.

In the process of the present invention, on the other hand, the second melt for forming the antistatic layer is added with a mixed plasticizer containing component (A) being a specific alcohol which has a high plasticizing effect for the ionomer resin. Therefore, even when the extrusion temperature of the second melt for forming the antistatic layer is made low so as to match with the extrusion temperature of the first melt for forming the foam layer, the melt viscosity of the ionomer resin can be maintained in a low level. The plasticizing effect by the component (A) is attainable even when the ionomer resin has a low melt flow rate.

Further, the volatile plasticizer additionally contains component (B) which shows a high plasticizing effect for the polyethylene-based resin (PE-2). Therefore, even when the extrusion temperature of the second melt for forming the antistatic layer is made low so as to match with the extrusion temperature (generally 100 to 140° C.) of the first melt for forming the foam layer, the melt viscosity of the second melt as a whole can be maintained in a low level.

It is believed that, for the reasons as described above, the process of the present invention is able to form, in a stable manner, the laminated foam sheet having an antistatic layer which is laminated on at least one side of a foam layer and in which the ionomer resin is uniformly dispersed in the polyethylene-based resin (PE-2) to form a conductive network structure showing improved antistatic properties.

The component (A) of the volatile plasticizer is an alcohol having a boiling point of 120° C. or less. Examples of the alcohol include methanol, ethanol, 1-propanol, 2-propanol, 1-butanol, 2-methyl-1-propanol, 2-butanol and 2-methyl-2-propanol. These alcohols may be used singly or a mixture of two or more thereof. Above all, ethanol or a mixture of ethanol and one or more alcohols is preferred because of its capability of significantly lowering the melt viscosity of the ionomer resin and its easiness in handling during the fabrication of the laminated foam sheet. It is thus preferred that the component (A) contains ethanol in an amount of 50% by weight or more, more preferably 60% by weight or more, still more preferably 70% by weight or more, particularly preferably 80% by weight or more, based on the weight of the component (A).

The alcohol of the component (A) must have a boiling point of 120° C. or less in order that the alcohol swiftly disappears from the antistatic layer as soon as the laminated foam sheet has been produced and does not remain therein. From this standpoint of view, the boiling point of the alcohol is preferably 100° C. or less, more preferably 90° C. or less, particularly preferably 85° C. or less. For reasons of easiness in handling, the lower limit of the boiling point of the alcohol is preferably 40° C., more preferably 50° C.

The component (B) of the volatile plasticizer is at least one selected from the group consisting of saturated hydrocarbons having 3 to 5 carbon atoms and dialkyl ethers in which each alkyl has 1 to 3 carbon atoms. Specific examples of the saturated hydrocarbons having 3 to 5 carbon atoms include propane, n-butane, isobutane, n-pentane and isopentane. The use of n-butane, isobutane or a mixture thereof is particularly preferred for reasons of its excellent plasticizing effect for the polyethylene-based resin (PE-2) and its capability of effectively reducing the melt viscosity of the polyethylene-based resin (PE-2) during the coextrusion lamination process. When n-butane and isobutane are used as a mixture, the mixing ratio is not specifically limited. However, the mixing ratio of n-butane to isobutane is preferably 50:50 to 90:10, more preferably 60:40 to 80:20.

Examples of dialkyl ethers in which each alkyl has 1 to 3 carbon atoms include dimethyl ether, diethyl ether, dipropyl ether and methyl ethyl ether. Dimethyl ether is particularly preferred for reasons of its excellent plasticizing effect for the polyethylene-based resin (PE-2) and its capability of effectively reducing the melt viscosity of the polyethylene-based resin (PE-2) during the coextrusion lamination process.

It is important that the volatile plasticizer should be present in the second melt in an amount of 0.1 to 10 mols per kg of the total weight of the polyethylene-based resin (PE-2) and the ionomer resin. When the amount of the volatile plasticizer is lower than the above range, the second melt cannot be sufficiently plasticized and the melt viscosity thereof cannot be sufficiently reduced. As a consequence, it becomes difficult to appropriately disperse the ionomer resin in the polyethylene-based resin (PE-2). Additionally, there is a possibility that a uniform antistatic layer cannot be obtained due to film forming failure and stretching failure of the second melt. From this point of view, the lower limit of the amount of the volatile plasticizer is preferably 0.5 mol, more preferably 1 mol, still more preferably 1.5 mols, particularly preferably 2 mols per kg of the total weight of the polyethylene-based resin (PE-2) and the ionomer resin. Too high an amount of the volatile plasticizer beyond the above range, on the other hand, tends to cause separation of the plasticizer from the second melt, spout thereof from the die and lamination failure of the antistatic layer on the foam layer. From this point of view, the upper limit of the amount of the volatile plasticizer is preferably 9 mols, more preferably 8 mols, particularly preferably 7 mols, per kg of the total weight of the polyethylene-based resin (PE-2) and the ionomer resin.

It is also important that a molar ratio (A/B) of the component (A) to the component (B) should be 5:95 to 95:5 in order to plasticize both of the polyethylene-based resin (PE-2) and the ionomer resin. When the molar ratio (A/B) is less than the above range, the ionomer resin fails to be plasticized so that the desired antistatic properties cannot be obtained. Too large a molar ratio (A/B) causes failure to plasticize the polyethylene-based resin (PE-2) so that uniform antistatic layer cannot be obtained. For this reason and since a lower content of the ionomer resin gives a better laminated foam sheet in a stable manner, the molar ratio (A/B) is preferably 6:94 to 80:20, still more preferably 8:92 to 70:30, yet still more preferably 9:91 to 60:40, particularly preferably 10:90 to 50:50.

It is preferred that the component (A) is present in the second melt in an amount of 1 to 25 mols per kg of the ionomer resin, for reasons that the ionomer resin is properly plasticized, the melt viscosity of the ionomer resin is able to be adjusted in a range suited for extrusion molding and, additionally, the ionomer resin can be dispersed in the polyethylene-based resin (PE-2) in such a state as to form a desired antistatic network structure. From this point of view, the lower limit of the amount of the component (A) is preferably 2 mols, more preferably 3 mols, still more preferably 4 mols, particularly preferably 6 mols, while the upper limit is preferably 24 mols, more preferably 22 mols, particularly preferably 20 mols, each per kg of the ionomer resin.

In the process of the present invention, the above-described first and second melts are introduced into separate passageways of a die and combined such that the stream of the second melt for forming the antistatic layers is laminated on one or both sides of the stream of the first melt for forming the foam layer. The combined streams are then coextruded and discharged through the die into a lower pressure environment, generally into the atmosphere, to obtain the laminate foam sheet that is composed of a foam layer and one or two antistatic layer laminated on one or both sides of the foam layer and that shows tight bonding between adjacent layers.

The coextrusion foaming process includes two different methods. One method uses a flat coextrusion die through which a sheet like laminate is extruded and foamed to obtain the intended laminated foam sheet. Another method uses a circular die through which a tubular laminate is extruded and foamed. The tubular extruded laminate is then drawn and enlarged over a mandrel and cut open to obtain the intended laminated foam sheet. Of these methods, the method using a circular die is preferred for reasons of easiness in producing a wide laminated foam sheet having a width (transverse length) of 1,000 mm or more.

In one preferred method for producing the laminated foam sheet by a coextrusion foaming process using a circular die, a polyethylene-based resin (PE-1) and, if necessary, one or more additives such as a cell controlling agent are fed to a first extruder and heated and kneaded, into which a physical blowing agent is injected. The resulting mixture is further kneaded to obtain a first melt for forming a foam layer. At the same time, a polyethylene-based resin (PE-2), an ionomer resin as a polymeric antistatic agent and, if necessary, one or more additives are fed to a second extruder and heated and kneaded, into which a volatile plasticizer is injected. The resulting mixture is further kneaded to obtain a second melt for forming an antistatic layer. The first and second melts thus obtained are fed to a circular coextrusion die and combined. The combined stream is then coextruded through the die into the atmosphere and allowed to foam and expand. The tubular extruded laminate is then drawn and enlarged over a mandrel and cut open to obtain the intended laminated foam sheet.

One or more additives may be contained in the second melt forming the antistatic layer to the extent that the object of the present invention is not adversely affected. Examples of the additives include an antioxidant, a heat stabilizer, a weathering stabilizer, a UV absorbing agent, a flame retardant, a filler and an antibacterial agent. The addition amount of the additive or additives may be suitably determined in view of the object and effect thereof but is preferably 10 parts by weight or less, more preferably 5 parts by weight or less, still more preferably 3 parts by weight or less, based on 100 parts by weight of the second melt.

The physical blowing agent that is incorporated into the first melt for forming the foam layer may be organic or inorganic physical blowing agent. As the organic physical foaming agent, there may be mentioned, for example, aliphatic hydrocarbons such as propane, n-butane, isobutane, n-pentane, isopentane, n-hexane and isohexane; alicyclic hydrocarbons such as cyclopentane and cyclohexane; chlorinated hydrocarbons such as methyl chloride and ethyl chloride; fluorinated hydrocarbons such as 1,1,1,2-tetrafluoroethane and 1,1-difluoroethane. As the inorganic physical foaming agent, there may be mentioned, for example, nitrogen, carbon dioxide, air and water. These physical blowing agents may be used as a mixture of two or more thereof. If desired, a decomposition type blowing agent such as azodicarbonamide may be used. Above all, organic physical blowing agents, particularly those which contain as their major ingredient n-butane, isobutane or a mixture thereof, are preferred for reasons of their compatibility with the polyethylene-based resin (PE-1) and foamability. When n-butane and isobutane are used as a mixture, the mixing ratio is not specifically limited. However, the mixing ratio of n-butane to isobutane is preferably 50:50 to 90:10, more preferably 60:40 to 80:20.

The addition amount of the blowing agent is controlled in view of the kind of the blowing agent and the intended apparent density of the laminated foam sheet. When butane or mixed butane is used as a physical blowing agent, for example, the addition amount thereof is preferably 3 to 30% by weight, more preferably 4 to 20% by weight, more preferably 6 to 18% by weight, based on 100% by weight of the polyethylene-based resin (PE-1).

Among the additives that are optionally added to the first melt for forming the foam layer, a cell controlling agent is important. As the cell controlling agent, there may be used an inorganic or organic material. Examples of the inorganic cell controlling agent include metal salts of boric acid (such as zinc borate, magnesium borate and borax), sodium chloride, aluminum hydroxide, talc, zeolite, silica, calcium carbonate and sodium bicarbonate. Examples of the organic cell controlling agent include sodium 2,2-methylene-bis(4,6-di-t-butylphenyl)phosphate, sodium benzoate, calcium benzoate, aluminum benzoate and sodium stearate. Also usable as the cell controlling agent is of a sodium bicarbonate-citric acid-type that uses, for example, a combination of sodium bicarbonate with citric acid or a combination of sodium bicarbonate with an alkali metal salt of citric acid. These cell controlling agents may be used singly or in combination of two or more thereof. The addition amount of the cell controlling agent is adjusted in view of the intended cell diameters.

The preferred physical properties and preferred morphology of the laminated foam sheet obtained by the process of the present invention will be next described.

The laminated foam sheet preferably has two antistatic layers provided on both sides of the foam layer, especially when used as an interleaf sheet that is to be interposed between articles such as glass plates. The thickness (total thickness) of the laminated foam sheet is preferably 0.05 to 2 mm in order to improve the carrying efficiency in transportation of articles between which the laminated foam sheets are interposed. From this point of view, the upper limit of the thickness is more preferably 1.5 mm, still more preferably 1.2 mm, particularly preferably 1.0 mm. The lower limit of the thickness of the laminated foam sheet is preferably 0.1 mm, still more preferably 0.2 mm, particularly preferably 0.3 mm, for ensuring desired cushioning property thereof.

The laminated foam sheet preferably has an apparent density of 20 to 200 kg/m$^3$, more preferably 30 to 150 kg/m$^3$, still more preferably 50 to 120 kg/m$^3$, for reasons of good balance between its lightness in weight, handleability and cushioning property. From the same reasons, the basis weight of the laminated sheet is preferably 10 to 200 g/m$^2$, more preferably 15 to 100 g/m$^2$, still more preferably 20 to 80 g/m$^2$.

It is also preferred that the antistatic layer (or each of the two antistatic layers) has a basis weight Bw of 50 g/m$^2$ or less, more preferably 40 g/m$^2$ or less, still more preferably 30 g/m$^2$ or less, yet still more preferably 20 g/m$^2$ or less, further more preferably 10 g/m$^2$ or less, particularly preferably 5 g/m$^2$ or less, from the standpoint of costs, lightness in weight as well as maintenance of desired antistatic properties. The lower limit of the basis weight Bw is preferably 1 g/m², particularly preferably 1.5 g/m², for reasons of improved layer forming efficiency.

The thicknesses of the laminated foam sheet and antistatic layer may be determined as follows. A laminated foam sheet is vertically (in the thickness direction) cut along the transverse direction (direction normal to the extrusion direction) thereof and the vertical cross section is photographed at ten, transversely spaced apart positions. On each of the ten photographs (enlarged), the thicknesses of antistatic layer and the laminated foam sheet are measured. The arithmetic mean of the ten measured thickness values of the antistatic layer and the arithmetic mean of the ten measured thickness values of the laminated foam sheet are calculated. The above measurement and calculation are repeated at three randomly selected locations of the laminated foam sheet in total. The arithmetic mean of the calculated values in the three locations represent the thicknesses of the antistatic layer and the laminated sheet.

The basis weight of the laminated foam sheet is measured as follows. A laminated foam sheet is vertically cut in the transverse direction to obtain a test piece having a width of, for example, 100 mm and a length equal to the transverse length of the laminated foam sheet. The test piece is measured for its weight [g]. The measured weight is divided by its area [m²] to obtain the basis weight [g/m²] of the test piece. The apparent density [kg/m³] of the laminated foam sheet is determined by dividing the basis weight [kg/m²] thereof by the thickness [m] of the test piece (with appropriate unit conversion).

The basis weight [kg/m²] of the antistatic layer is calculated by multiplying the thickness thereof by the density of the resin composition thereof with appropriate unit conversion. As used herein the term "resin composition" is intended to include not only the ethylene-based resin (PE-2) and the ionomer resin but also other polymeric components and inorganic components optionally used in the antistatic layer.

Alternatively, the basis weight of the antistatic layer may be also determined on the basis of the extrusion rate thereof. More specifically, the basis weight Bw [g/m²] of the antistatic layer may be calculated by the following formula:

$$Bw = [1000X/(L \times W)]$$

wherein X represents an extrusion rate [kg/h] of the antistatic layer, L represents a drawing rate [m/h] of the laminated foam sheet and W represents the width (transverse length) [m] of the laminated foam sheet.

Further, when the basis weight of the laminated foam sheet and the ratio of the extrusion rate of the antistatic layer relative to the extrusion rate of the foam layer are known, the basis weight of the antistatic layer may be determined by simple calculation.

The antistatic layer of the laminated foam sheet preferably has a surface resistivity of $1 \times 10^{13} \Omega$, or less, more preferably less than $5 \times 10^{12} \Omega$, particularly preferably $1 \times 10^{12} \Omega$ or less, for reasons that the laminated foam sheet shows excellent antistatic properties and dust accumulation preventing effect. The lower limit of the surface resistivity is not specifically limited but is generally about $1 \times 10^7 \Omega$. As long as the above surface resistivity is attainable, one or both sides of the antistatic layers may be further overlaid with a surface layer that is substantially free of a polymeric antistatic agent.

The surface resistivity of the antistatic layer is measured according to JIS K6271(2001). More specifically, a test piece (having a length of 100 mm, a width of 100 mm and a thickness equal to that of the laminated foam sheet to be measured) is cut out from the laminated foam sheet. Then the test piece is impressed with a voltage of 500 V and measured for the surface resistivity [n] of the antistatic layer 1 minute after the commencement of the voltage impression.

The present invention also provides a laminated foam sheet that has a specific morphology and that is produced by the above-described process of the present invention. The laminated foam sheet has an antistatic layer that is provided on one or both sides of a foam layer and that contains a polyethylene-based resin (PE-2) and an ionomer resin as a polymeric antistatic agent.

In the antistatic layer, the polyethylene-based resin (PE-2) forms a continuous phase (sea) and the ionomer resin forms dispersed phases (islands) dispersed in the continuous phase. Because the polyethylene-based resin (PE-2) forms a continuous phase, the antistatic layer shows excellent flexibility and cushioning properties. Further, although the ionomer resin is used as a polymeric antistatic agent, the foam sheet exhibits excellent antistatic properties because the ionomer resin forms dispersed phases that are stretched in the form of streaks to form a conductive network.

The antistatic layer of the laminated foam sheet according to the present invention has such morphology that the dispersed phases of the ionomer resin are small in size and stretched in a specific degree. The morphology is represented by a number-based median value $S_{50}$ and a $LM_{50}/LT_{50}$ ratio. These parameters are next described in detail.

The number-based median value $S_{50}$ of cross-sectional areas of the dispersed phases of the laminated foam sheet, which pertains to the size of the dispersed phases, should be in the range of $1 \times 10^2$ to $1 \times 10^6$ nm². The number-based median cross-sectional area $S_{50}$ is a cross-sectional area of that dispersed phase which is located in the middle of the total number of dispersed phases arranged in the order of their sizes (at 50% of the cumulative number). The cross-sectional areas of the dispersed phases are measured on a vertical (thickness direction) cross-section of the antistatic layer, which is taken along the extrusion direction (machine direction or direction normal to the transverse and vertical directions) of the laminated foam sheet. From the number-based median cross-sectional area $S_{50}$, it is possible to evaluate the degree of contribution of the ionomer resin dispersed phases to the antistatic performance of the antistatic layer.

More specifically, when $S_{50}$ is $1 \times 10^2$ to $1 \times 10^6$ nm², small size ionomer dispersed phases are dispersed in the matrix of the polyethylene-based resin (PE-2) in a significant proportion. Such a small $S_{50}$ has never been conventionally attained. Too small a $S_{50}$ value below the above range cannot develop desired antistatic properties. When $S_{50}$ exceeds the above range, on the other hand, the dispersion phases cannot be appropriately dispersed in the matrix resin and the desired antistatic property cannot be attained. From the above point of view, the lower limit is preferably $5 \times 10^2$ nm², more preferably $1 \times 10^3$ nm², and the upper limit is preferably $1 \times 10^5$ nm², more preferably $5 \times 10^4$ nm².

In addition to the above described $S_{50}$, a $LM_{50}/LT_{50}$ ratio which pertains to the shape of the dispersed phases is also important to attain the desired antistatic property. The $LM_{50}/LT_{50}$ ratio is a ratio of a number-based median value $LM_{50}$ of diameters in the extrusion direction of the dispersed phases to a number-based median value $LT_{50}$ of diameters in the thickness direction of the dispersed phases and should be 2 or more. When the $LM_{50}/LT_{50}$ ratio is 2 or more, the dispersed phases are each stretched in the form of streaks, thereby to form a desired antistatic network structure.

The number-based median value $LM_{50}$ of diameters in the extrusion direction of the dispersed phases and the number-based median value $LT_{50}$ of diameters in the thickness direction of the dispersed phases may be determined as follows. A vertical cross-section of the antistatic layer is taken along the extrusion direction of the laminated foam sheet. On the vertical cross-section, the dispersed phases are measured for their Feret's diameters in both the extrusion and thickness directions.

The number-based median diameter $LM_{50}$ of the dispersed phases is the Feret's diameter in the extrusion direction of that dispersed phase which is located in the middle of the total number of dispersed phases arranged in the order of their Feret's diameters (at 50% of the cumulative number). Similarly, the number-based median diameter $LT_{50}$ of the dispersed phases is the Feret's diameter in the thickness direction of that dispersed phase which is located in the middle of the total number of dispersed phases arranged in the order of their Feret's diameters (at 50% of the cumulative number).

The fact that the $LM_{50}/LT_{50}$ ratio is 2 or more indicates that the dispersed phases are stretched in the extrusion direction. Therefore, the dispersed ionomer resin is facilitated to form a conductive network structure and, hence, the antistatic layer shows improved antistatic properties. Too small a $LM_{50}/LT_{50}$ ratio below the above range is insufficient to form an antistatic network structure required for obtaining desired antistatic properties. From this point of view, the $LM_{50}/LT_{50}$ ratio is preferably 3 or more. The upper limit of the $LM_{50}/LT_{50}$ ratio is generally about 20, preferably 10, more preferably 6, for reasons of achievement of the desired antistatic property in a stable manner.

In the antistatic layer of the laminated foam sheet which meets with the above specific requirements with respect to the area median value $S_{50}$ and diameter ratio $LM_{50}/LT_{50}$, the dispersed phases of the ionomer resin are small in size and stretched in a specific degree. Therefore, the laminated foam sheet shows excellent antistatic properties such as a surface resistivity of $1 \times 10^{12}$ n or less. Additionally, the use of the ionomer resin as the antistatic agent can reduce staining of an article which is maintained in direct contact with the laminated foam sheet.

It is preferred that the number-based median value $LT_{50}$ of diameters in the thickness direction of the dispersed phases is 10 to 1,000 nm, more preferably 15 to 600 nm, still more preferably 20 to 500 nm, particularly preferably 30 to 300 nm, for reasons of obtaining of a laminated foam sheet having excellent antistatic properties in a stable manner.

It is also preferred that at least one dispersed phase (island) of the ionomer resin is present, on average, on a line segment extending throughout the antistatic layer in the vertical (thickness) direction thereof for reasons of easiness of obtaining desired antistatic properties. From this point of view, the average number NT of the dispersed phases on such a vertical line segment is more preferably 2 or more, particularly preferably 5 or more. The upper limit of the average number NT is generally about 100, still more preferably 30, especially preferably 20.

The average number NT is determined as follows. Six cross-sectional images of the antistatic layer are taken along the extrusion direction thereof at six arbitrarily selected positions which are transversely spaced apart from each other.

Next, on each of the six cross-sectional images, five vertical lines separated at an interval of 2 μm are drawn throughout the thickness of the antistatic layer. The number of the dispersed phases that intersect the vertical line segments is counted. The sum of the counts is divided by the number of the line segments (30 (6 images×5 positions)) to obtain the average number NT of the dispersion phases that intersect a vertical line segment extending between both sides of the antistatic layer.

For the determination of each of the above-described area median value $S_{50}$, diameter ratio $LM_{50}/LT_{50}$ and average number NT of the ionomer resin dispersed phases in the antistatic layer of the laminated foam sheet, the laminated foam sheet is cut in the vertical direction along the extrusion direction thereof to obtain a test piece, in the form of a thin film, having a vertical cross-section of the laminated foam sheet. The thin film is then stained and measured by a transmission electron microscope to obtain a cross-sectional image. On the obtained image, the morphology of the dispersion phases is measured in the manner described above. The method for measuring the morphology will be hereinafter described in more detail below in Examples of the invention.

The laminated foam sheet obtained by the process of the present invention may be used as, for example, interleaf sheets and cushioning or packaging materials for electronic devices. The laminated foam sheet is particularly useful as an interleaf sheet for being inserted between glass substrates that are employed as glass panels for various image display devices such as liquid crystal display, plasma display and electroluminescence display.

The following examples and comparative examples will further illustrate the present invention. The polyethylene-based resins, ionomer resin polymeric antistatic agent, blowing agent, volatile plasticizer and cell controlling agent used in Examples 1 toll and Comparative Examples 1 to 4 were as given below.

(1) Polyethylene-based resin (PE-1 and PE-2):
   Low-density polyethylene (Tradename "NUC8009" manufactured by NUC Corporation), Density: 917 kg/m$^3$, MFR: 9.0 g/10 min, Melting point: 107° C.;

(2) Ionomer resin (polymeric antistatic agent):
   Potassium ionomer resin (Tradename "ENTIRA MK400" manufactured by duPont-Mitsui Polychemicals Co., Ltd.), Density: 970 kg/m$^3$, MFR: 1.5 g/10 min, Melting point: 93° C., Surface resistivity: $1.0 \times 10^7$ Ω;

(3) Physical blowing agent: Mixed butane composed of 65 wt % of n-butane and 35 wt % of isobutane;

(4) Volatile plasticizer (Blend of Components (A) and (B)):
   Component (A): Ethanol (Tradename "ETHANOL (99.5)" manufactured by Kanto Chemical Co., Inc.);
   Component (A): Alcohol mixture (Tradename "MIX ETHANOL NP" manufactured by Yamaichi Chemical Industries, Co., Ltd.), Blend of 85.5 wt % of ethanol, 4.9 wt % of isopropyl alcohol and 9.6 wt % of n-propyl alcohol;

Component (B): Mixed butane composed of 65 wt % of n-butane and 35 wt % of isobutane;
Component (B): Dimethyl ether;
(5) Cell controlling agent:
Blend of citric acid and sodium bicarbonate (Product Name: PO-217K manufactured by Dainichiseika Color & Chemicals Mfg. Co., Ltd.).

The apparatus used for forming the laminated foam sheet in Examples 1 to 11 and Comparative Examples 1 to 4 was as follows. For forming a foam layer, a tandem extruder having a first extruder with an inside diameter of 90 mm and a second extruder with an inside diameter of 120 mm connected in series to the downstream side of the first extruder was used. For forming an antistatic layer, a third extruder with an inside diameter of 50 mm was used. A coextrusion circular die having an outlet diameter of 94 mm was used for forming a laminated foam sheet. The circular die was provided with separate tubular passageways constructed such that a melt for forming the antistatic layers was combined with and laminated on inner and outer sides of a tubular stream of a melt for forming a foam layer.

EXAMPLE 1

To the first extruder were supplied 100 parts by weight of the polyethylene-based resin PE-1 and 1.6 parts by weight of the cell controlling agent per 100 parts by weight of PE-1. The feeds were melted and kneaded at about 200° C. in the first extruder, to which the physical blowing agent was injected in an amount of 12 parts by weight per 100 parts by weight of the polyethylene-based resin PE-1 and kneaded together. The kneaded mass was then fed to the second extruder connected downstream of the first extruder and adjusted at a resin temperature of about 112° C. to obtain a melt for forming a foam layer.

At the same time, the polyethylene-based resin PE-2 (same as PE-1) and the ionomer resin were supplied to the third extruder and, then, melted and kneaded at a temperature of about 200° C. Thereafter, a volatile plasticizer having a composition shown in Table 1-1 was injected into the kneaded mass in the third extruder in an amount shown in Table 1-1 and kneaded together and adjusted to a resin temperature of about 120° C. to obtain a melt for forming an antistatic layer. The addition amount of the ionomer resin (in terms of % by weight based on the total weight (100% by weight) of the ionomer resin and polyethylene-based resin PE-2), the molar amount of component (A) (ethanol) per kg of the total weight of the ionomer resin and the polyethylene-based resin PE-2, the molar amount of component (A) (ethanol) per kg of the ionomer resin, the molar amount of component (B) (mixed butane) per kg of the total amount of the ionomer resin and the polyethylene-based resin PE-2, the molar amount of the volatile plasticizer per kg of the total amount of the ionomer resin and the polyethylene-based resin PE-2, and mole ratio of the component (A) to the component (B) are summarized in Table 1-1.

Into the coextrusion circular die, the thus prepared melts for forming the foam layer and the antistatic layer were fed from respective extruders at a discharge rate (extrusion rate) of 60 kg/hour in the case of the melt for forming the foam layer and at 5 kg/hour in the case of each of the antistatic layers. The feeds in the circular die were combined such that two tubular streams of the melt for forming the antistatic layers were laminated respectively on inner and outer sides of the tubular stream of the melt for forming the foam layer. The combined streams were then coextruded and discharged through the coextrusion die into the atmosphere to obtain a tubular laminate foam product with a three-layer structure. The tubular laminate foam product was drawn, while being enlarged over a mandrel with an outer diameter of 350 mm, and cut open in the extrusion direction to obtain the laminated foam sheet having a width of about 1000 mm. The draw rate of the tubular laminate was adjusted so that the basis weight of the laminated foam sheet was as shown in Table 2. The thickness and apparent density of the laminated foam sheet and the basis weights of the foam layer and the antistatic layer (one antistatic layer) of the laminated foam sheet are also shown in Table 2.

TABLE 1-1

| | PE-2 Amount (% by weight) | Ionomer Amount (% by weight) | Volatile Plasticizer | | | | | |
|---|---|---|---|---|---|---|---|---|
| | | | Component (A) | | | Component (B) | | Total amount of Components (A) and (B) |
| | | | Kind | Amount per kg of Ionomer plus PE-2 (mol/kg) | Amount per kg of Ionomer (mol/kg) | Kind | Amount per kg of Ionomer plus PE-2 (mol/kg) | Amount per kg of Ionomer plus PE-2 (mol/kg) | Molar ratio of (A)/(B) |
| Example 1 | 85 | 15 | Ethanol | 0.35 | 2.3 | Mixed butane | 3.45 | 3.8 | 9.2:90.8 |
| Example 2 | 85 | 15 | Ethanol | 1.74 | 11.6 | Mixed butane | 3.45 | 5.19 | 33.5:66.5 |
| Example 3 | 85 | 15 | Alcohol Mixture | 3.13 | 20.9 | Mixed butane | 3.45 | 6.58 | 47.6:52.4 |
| Example 4 | 85 | 15 | Alcohol Mixture | 1.66 | 11.1 | Mixed butane | 1.74 | 3.4 | 48.8:51.2 |
| Example 5 | 85 | 15 | Alcohol Mixture | 1.66 | 11.1 | Mixed butane | 0.43 | 2.09 | 79:21 |

TABLE 1-2

| | PE-2 | Ionomer | Volatile Plasticizer | | | | | |
|---|---|---|---|---|---|---|---|---|
| | | | Component (A) | | Component (B) | | Total amount of Components (A) and (B) | |
| | Amount (% by weight) | Amount (% by weight) | Kind | Amount per kg of Ionomer plus PE-2 (mol/kg) | Amount per kg of Ionomer (mol/kg) | Kind | Amount per kg of Ionomer plus PE-2 (mol/kg) | Amount per kg of Ionomer plus PE-2 (mol/kg) | Molar ratio of(A)/(B) |
| Example 6 | 85 | 15 | Alcohol Mixture | 0.67 | 4.5 | Mixed butane | 0.43 | 1.1 | 61:39 |
| Example 7 | 70 | 30 | Alcohol Mixture | 0.83 | 2.8 | Mixed butane | 0.83 | 1.66 | 50:50 |
| Example 8 | 50 | 50 | Alcohol Mixture | 0.83 | 1.7 | Mixed butane | 0.83 | 1.66 | 50:50 |
| Comp. Ex. 1 | 85 | 15 | — | — | 0.0 | Mixed butane | 3.45 | 3.45 | 0:100 |
| Comp. Ex. 2 | 85 | 15 | — | — | 0.0 | Dimethyl ether | 3.46 | 3.46 | 0:100 |

EXAMPLES 2 TO 8

Example 1 was repeated in the same manner as described above except that the proportion of the ionomer resin relative to the polyethylene-based resin PE-2 (in Examples 7 and 8), the composition of the volatile plasticizer and the amount of the volatile plasticizer were changed as shown in Table 1-1 and Table 1-2 to obtain laminated foam sheets. The draw rate of each tubular laminate was adjusted so that the basis weight of each laminated foam sheet was as shown in Table 2. The thickness and apparent density of each laminated foam sheet and the basis weights of the foam layer and the antistatic layer (per one antistatic layer) of each laminated foam sheet are also shown in Table 2.

COMPARATIVE EXAMPLES 1 AND 2

Example 1 was repeated in the same manner as described above except that no component (A) was used and that the composition and amount of the volatile plasticizer were changed as shown in Table 1-2 to obtain laminated foam sheets.

The physical properties of the thus obtained laminated foam sheets are summarized in Table 2.

TABLE 2

| | Thickness mm | Apparent Density kg/m$^3$ | Basis Weight | | | Surface resistivity | | Evaluation of Antistatic Properties |
|---|---|---|---|---|---|---|---|---|
| | | | Foam Layer g/m$^2$ | Antistatic Layer g/m$^2$ | Whole sheet g/m$^2$ | S side Ω | M side Ω | |
| Example 1 | 0.50 | 62 | 27 | 2 | 31 | $1.9 \times 10^{11}$ | $2.9 \times 10^{11}$ | good |
| Example 2 | 0.50 | 64 | 28 | 2 | 32 | $2.2 \times 10^9$ | $2.6 \times 10^9$ | good |
| Example 3 | 0.52 | 63 | 29 | 2 | 33 | $2.0 \times 10^9$ | $2.4 \times 10^9$ | good |
| Example 4 | 0.43 | 72 | 27 | 2 | 31 | $2.4 \times 10^9$ | $3.0 \times 10^9$ | good |
| Example 5 | 0.50 | 58 | 25 | 2 | 29 | $1.7 \times 10^9$ | $3.2 \times 10^9$ | good |
| Example 6 | 0.43 | 65 | 24 | 2 | 28 | $4.7 \times 10^9$ | $6.7 \times 10^9$ | good |
| Example 7 | 0.60 | 50 | 26 | 2 | 30 | $1.1 \times 10^9$ | $1.1 \times 10^9$ | good |
| Example 8 | 0.58 | 51 | 26 | 2 | 30 | $6.3 \times 10^8$ | $5.5 \times 10^8$ | good |
| Comp. Example 1 | 0.33 | 88 | 25 | 2 | 29 | ∞ | ∞ | no good |
| Comp. Example 2 | 0.25 | 120 | 26 | 2 | 30 | ∞ | ∞ | no good |

In Table 2, the thickness, apparent density and basis weight of the laminated foam sheet, and the basis weight of the foam layer and antistatic layer are measured by the methods descried above. The basis weight of the antistatic layer was determined by calculation on the basis of the basis weight of the laminated foam sheet and the ratio of the extrusion rate of the antistatic layer relative to the extrusion rate of the foam layer.

The surface resistivity of each of the antistatic layers provided on both sides of the foam layer was determined by the following method. Three test pieces, each having a length of 100 mm, a width of 100 mm and a thickness equal to that of the laminated foam sheet are cut out from randomly selected locations. Then, in accordance with the method of JIS K6271 (2001), each of the test pieces is placed in an environment with a temperature of 23° C. and a relative humidity of 50% and impressed with a voltage of 500 V. The surface resistivity of each test piece is measured 1 minute after the commencement of the voltage impression. The measurement is carried out on each of the both surfaces of each of the three test pieces. The surface resistivity of each side of the laminated foam sheet is an arithmetic mean of the three measured values. As the measurement instrument, Model TR8601 manufactured by Takeda Riken Industry Co., Ltd. is used. In Table 2, "M side" is that side of the laminated foam sheet which faced the mandrel during the fabrication thereof, while "S side" is the opposite side of the M side.

The antistatic properties of the laminated foam sheets were evaluated on the basis of the following criteria.

Good: Surface resistivity of the antistatic layer is $1 \times 10^{13} \Omega$ or less.

No good: Surface resistivity of the antistatic layer exceeds $1 \times 10^{13} \Omega$.

The results are shown in Table 2. The laminated foam sheets of Comparative Examples 1 and 2 did not show antistatic properties.

EXAMPLE 9 TO 11

Example 1 was repeated in the same manner as described above except that the cell controlling agent was supplied to the first extruder in an amount of 2 parts by weight per 100 parts by weight of the polyethylene-based resin PE-1 and that the composition of the volatile plasticizer and the amount of the volatile plasticizer were changed as shown in Table 3 to obtain laminated foam sheets.

COMPARATIVE EXAMPLES 3 AND 4

Example 9 was repeated in the same manner as described above except that the composition of the volatile plasticizer and the amount of the volatile plasticizer were changed as shown in Table 3 to obtain laminated foam sheets.

The laminated foam sheets obtained in Examples 9 to 11 and Comparative Examples 3 and 4 were measured for their physical properties (thickness, basis weight and apparent density of each of the laminated foam sheets and the basis weight of the antistatic layer (one antistatic layer) thereof in the same manner as described above. Further, morphology of the antistatic layer (S side) was analyzed to give the results shown in Table 4. Also measured were antistatic properties and transference preventing properties (properties to prevent low molecular weight matters from transferring from the laminated foam sheets) of the laminated foam sheets to give the results shown in Table 5. The morphology and transference preventing properties were measured by the methods described hereinafter. The measurement of the surface resistivities of the antistatic layers and the evaluation of the antistatic properties of the laminated foam sheets were carried out in the same way as described above.

TABLE 3

| | PE-2 | Ionomer | Volatile Plasticizer | | | | | Total amount of Components (A) and (B) | |
| | | | Component (A) | | | Component (B) | | | |
| | Amount (% by weight) | Amount (% by weight) | Kind | Amount per kg of Ionomer plus PE-2 (mol/kg) | Amount per kg of Ionomer (mol/kg) | Kind | Amount per kg of Ionomer plus PE-2 (mol/kg) | Amount per kg of Ionomer plus PE-2 (mol/kg) | Molar ratio of (A)/(B) |
|---|---|---|---|---|---|---|---|---|---|
| Example 9 | 85 | 15 | Ethanol | 1.66 | 11.1 | Mixed butane | 3.45 | 5.11 | 32:58 |
| Example 10 | 85 | 15 | Ethanol | 0.83 | 5.5 | Mixed butane | 0.83 | 1.66 | 50:50 |
| Example 11 | 85 | 15 | Alcohol Mixture | 0.35 | 2.3 | Mixed butane | 3.45 | 3.8 | 9:91 |
| Comp. Ex. 3 | 85 | 15 | — | — | 0.0 | Mixed butane | 3.45 | 3.45 | 0:100 |
| Comp. Ex. 4 | 85 | 15 | — | — | 0.0 | Dimethyl ether | 3.46 | 3.46 | 0:100 |

TABLE 4

Physical Properties of Laminated Foam Sheet

| | Thickness mm | Apparent Density kg/m³ | Basis Weight Whole Sheet g/m² | Basis Weight Antistatic Layer g/m² | Morphology of Antistatic Layer $S_{50}$ nm² | $LT_{50}$ nm | $LM_{50}$ nm | NT | $LM_{50}/LT_{50}$ |
|---|---|---|---|---|---|---|---|---|---|
| Example 9 | 0.50 | 62 | 27 | 2 | $6.2 \times 10^3$ | 47 | 174 | 9.8 | 3.7 |
| Example 10 | 0.50 | 64 | 28 | 2 | $1.8 \times 10^4$ | 90 | 311 | 6.4 | 3.5 |
| Example 11 | 0.52 | 63 | 29 | 2 | $7.8 \times 10^5$ | 585 | 2585 | 1.3 | 4.4 |
| Comp. Example 3 | 0.33 | 88 | 25 | 2 | $7.0 \times 10^6$ | 2810 | 3198 | 0.33 | 1.1 |
| Comp. Example 4 | 0.25 | 120 | 26 | 2 | $6.5 \times 10^6$ | 2170 | 3860 | 0.50 | 1.8 |

TABLE 5

| | Antistatic Properties Surface Resistivity M side Ω | Antistatic Properties Surface Resistivity S side Ω | Antistatic Properties Evaluation | Transference Preventing Property Haze (H1-H0) % | Transference Preventing Property Evaluation |
|---|---|---|---|---|---|
| Example 9 | $2.8 \times 10^9$ | $2.0 \times 10^9$ | good | 0.33 | good |
| Example 10 | $1.0 \times 10^{10}$ | $6.0 \times 10^9$ | good | 0.67 | good |
| Example 11 | $3.1 \times 10^{11}$ | $6.3 \times 10^{10}$ | good | 0.78 | good |
| Comp. Ex. 3 | $>1.0 \times 10^{16}$ | $>1.0 \times 10^{16}$ | no good | — | — |
| Comp. Ex. 4 | $>1.0 \times 10^{16}$ | $>1.0 \times 10^{16}$ | no good | — | — |

Figure 2:
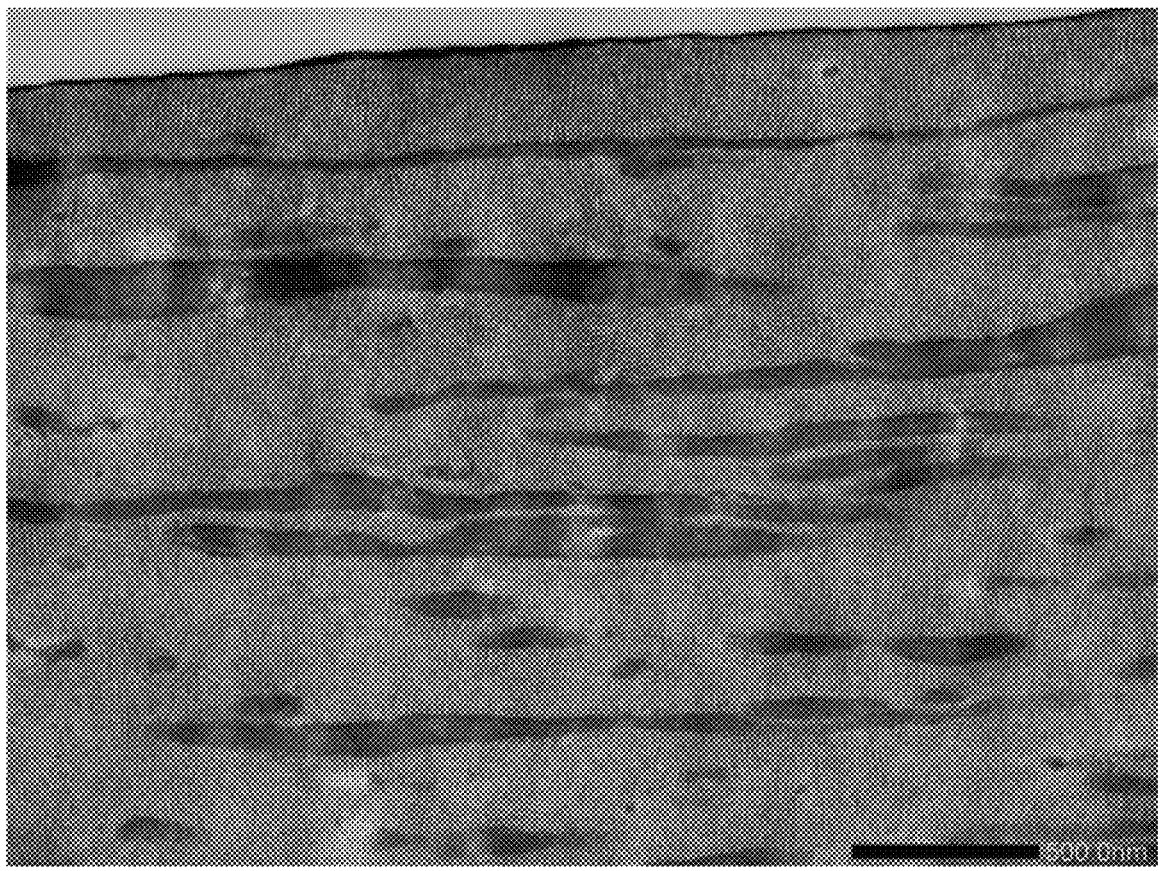
FIG. 2 is a transmission electron photomicrograph (at magnification of 70,000) of a vertical cross-section of an antistatic layer taken along the extrusion direction of the extruded laminated foam sheet obtained in Example 9.
Figure 3:
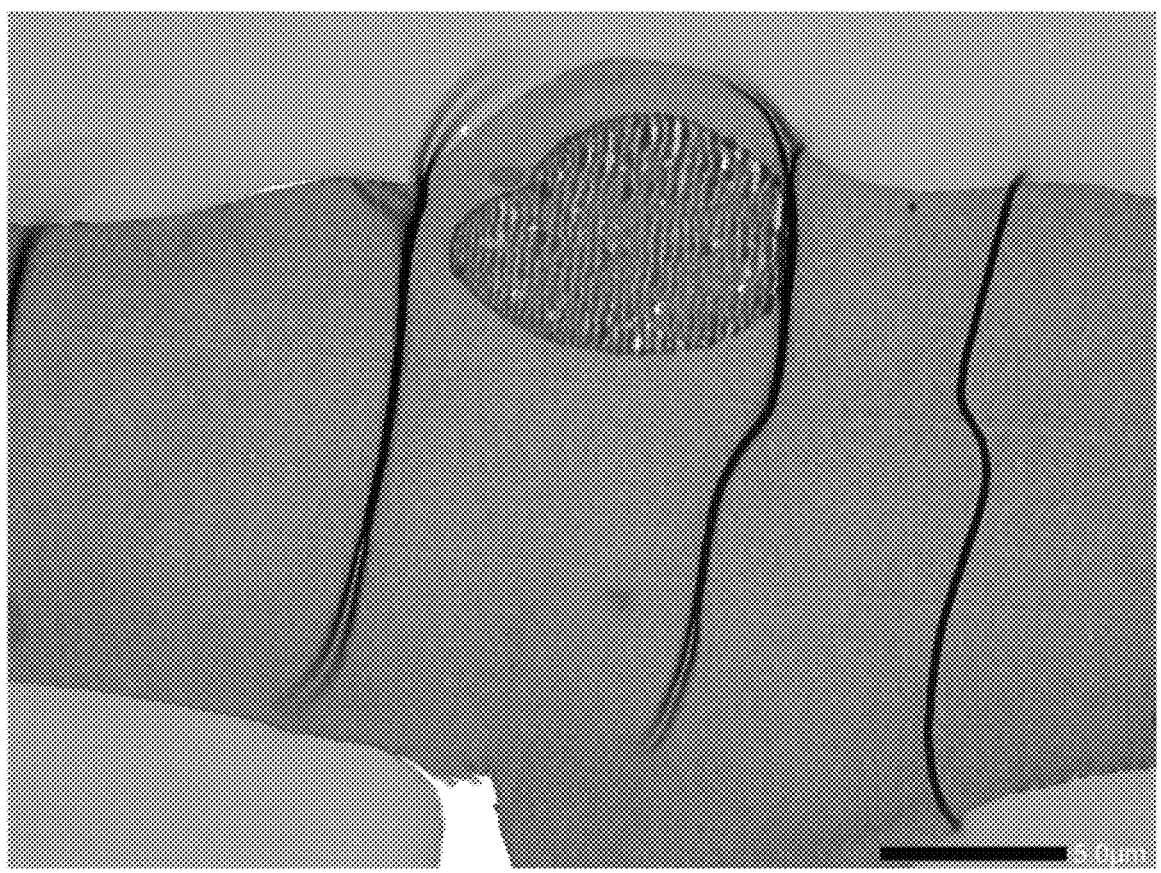
FIG. 3 is a transmission electron photomicrograph (at magnification of 7,000) of a vertical cross-section of an antistatic layer taken along the extrusion direction of an extruded laminated foam sheet obtained in Comparative Example 3.

Method of measuring $S_{50}$, $LM_{50}$ and $LT_{50}$ in Table 4:

The laminated foam sheet was cut, at three locations including near the center and both side ends in the traverse direction thereof, in the vertical direction along the extrusion direction thereof to obtain three test pieces each having a vertical cross-section of the laminated foam sheet. Each of the three test pieces was cut to obtain an ultrathin film having the vertical cross-section. Each film was then stained with ruthenium tetraoxide so that the polyethylene-based resin phase was able to be discriminated from the ionomer resin phase by light and dark tone. The stained cross-section of each film was observed and measured using a transmission electron microscope (JEM-1400Plus manufactured by JEOL Ltd.) at an acceleration voltage of 100 kV and at 7,000 and 70,000 fold magnification to obtain cross-sectional images. FIG. 1 and FIG. 2 are transmission electron photomicrographs at magnification of 7,000 and 70,000, respectively, of the antistatic layer of Example 9 and FIG. 3 is a similar transmission electron photomicrograph at magnification of 7,000 of the antistatic layer of Comparative Example 3. In FIGS. 1 to 3, the dark parts and light parts show ionomer resin phases and polyethylene-based resin phases, respectively.

The cross-sectional photograph was subjected to a pretreatment for the purpose of differentiate the dispersed phases from others (continuous phase) by black-white patterns on the basis of the contrast thereof and existence of a lamella structure. Since the ionomer resin has a higher amorphous content as compared with the polyethylene-based resin, the dispersed phases may be regarded as domains that lack lamellar structure as compared with the continuous phase in the cross-sectional photograph. The boundary portions between the continuous phase and dispersed phases were included in the dispersed phases. Then the pretreated cross-sectional photograph was analyzed with an image processing software (NonoHunter NS2K-Pro, manufactured by Nanosystem Co., Ltd.) under the following conditions:

(1) monochrome conversion
(2) smoothing filter (processing time: 1 to 10)
(3) binarization by NS method (definition: 41, sensitivity: 10, noise removal, concentration range: 45 to 255)
(4) Feret's diameter and area measurement In the measurement under the above conditions (1) to (4), a measuring region was selected at random from the cross-section of the antistatic layer in such a way that the total area of the selected region was at least 100 μm².

The number-based median value $S_{50}$ of cross-sectional areas of the dispersed phases in the antistatic layer was measured as follows. The number and cross-sectional areas of all the dispersed phases in the selected region were measured. Those dispersed phases which intersected the boundary of the selected region were included in the measurement. Those dispersion phases which had a cross-sectional area of 1 nm² or less were excluded from the measurement. Black portions, such as wrinkles and/or outermost parts of the film, that were not attributed to the dispersed phases were excluded from the measurement, either. The measurement was carried out for each of the above-described three test pieces. From the number of the dispersed phases and cross-sectional areas of the dispersed phases that were measured in the three test pieces, the number-based median value $S_{50}$ of cross-sectional areas of the dispersed phases in the antistatic layer was determined. The number-based median cross-sectional area $S_{50}$ is a cross-sectional area of the dispersed phase at 50% cumulative number of the dispersed phases arranged in the order of their sizes.

The number-based median value $LM_{50}$ of diameters in the extrusion direction of the dispersed phases and the number-based median value $LT_{50}$ of diameters in the thickness direction of the dispersed phases were determined as follows. Under the above conditions (1) to (4), the dispersed phases on the cross-sectional photograph were measured for their Feret's diameters in both the extrusion and thickness directions. Those dispersed phases which intersected the boundary of the selected region were included in the measurement. The measurement was carried out for each of the above-described three test pieces. From the number of the dispersed phases and Feret's diameters in both the extrusion and thickness directions of the dispersed phases that were measured in the three test pieces, $LM_{50}$ and $LT_{50}$ were determined. The number-based median diameter $LM_{50}$ of the dispersed phases is the Feret's diameter in the extrusion direction of the dispersed phase at 50% cumulative number of the dispersed phases arranged in the order of their Feret's diameters, while the number-based median diameter $LT_{50}$ of the dispersed phases is the Feret's diameter in the thickness direction of the dispersed phase at 50% of the cumulative number.

Method of measuring NT in Table 4:

The average number NT of the dispersion phases that intersect a vertical line segment extending between both sides of the antistatic layer was determined by the method described previously.

Method of measuring transference preventing property in Table 5:

Preclean slide glass manufactured by Matsunami Glass Industries, Ltd. was used as a material to be in direct contact with the laminated foam sheet. Ten sheets of the slide glasses were stacked one over the other to obtain a stack of ten glass sheets. This stack was measured for its haze value (HO [%]) in the thickness direction (stacking direction) of the laminate using a haze meter (Model NDH2000 manufactured by Nippon Denshoku Industries Co., Ltd.). Next, one side of each of ten sheets of the similar slide glasses was press-contacted with the laminated foam sheet at a pressure of 3.8 g/cm$^2$ and then allowed to quiescently stand as such in an environment maintained at a temperature of 60° C. and a relative humidity of 90% for 24 hours. Then, the laminated foam sheets were removed and the remaining ten sheets of the slide glass were stacked one over the other. The glass stack was measured for its haze value (H1 [%]) in the same manner as above. A difference (H1-H0) between the glass haze values before and after the contact with the laminated foam sheet was calculated. The smaller the difference (H1-H0), the lower is the transference of low molecular weight matters contained in the antistatic agent in the laminated foam sheet to the slide glass. The transference preventing property is rated as follows:

Good: the difference is 1.5% or less
No good: the difference exceeds 1.5%

What is claimed is:

1. An extruded laminated foam sheet comprising a polyethylene-based resin foam layer, and a polyethylene-based resin antistatic layer which is laminated on at least one side of the foam layer, which contains a polyethylene-based resin (PE-2) and an ionomer resin as a polymeric antistatic agent and which has a surface resistivity of $1\times10^{12}\Omega$ or less,
   wherein the polyethylene-based resin (PE-2) forms a continuous phase, and the ionomer resin forms dispersed phases dispersed in the continuous phase,
   wherein, on a vertical cross-section of the antistatic layer, which is taken along the extrusion direction of the laminated foam sheet, a number-based median value $S_{50}$ of cross-sectional areas of the dispersed phases is $1\times10^2$ to $1\times10^6$ nm$^2$ and a ratio $LM_{50}/LT_{50}$ of a number-based median value $LM_{50}$ of diameters in the extrusion direction of the dispersed phases to a number-based median value $LT_{50}$ of diameters in the thickness direction of the dispersed phases is 2 or more, and
   wherein the antistatic layer has a polystyrene-based resin content of less than 5% by weight based on the total weight of the polyethylene-based resin (PE-2) and the ionomer resin.

2. The extruded laminated foam sheet according to claim 1, wherein, on the vertical cross-section of the antistatic layer taken along the extrusion direction of the laminated foam sheet, an average number NT of the dispersion phases that intersect a vertical line segment extending between both sides of the antistatic layer is 1 or more.

3. The extruded laminated foam sheet according to claim 1, wherein the antistatic layer is substantially free of a polystyrene resin.

4. The extruded laminated foam sheet according to claim 1, wherein the ionomer resin has a melt flow rate of 3 g/10 min or less at a temperature of 190° C. and a load of 2.16 kg.

5. The extruded laminated foam sheet according to claim 1, wherein the polyethylene-based resin (PE-2) has a melt flow rate of 1 to 20 g/10 min at a temperature of 190° C. and a load of 2.16 kg.

6. The extruded laminated foam sheet according to claim 1, wherein the laminated foam sheet has an apparent density of 20 to 200 kg/m$^3$.

* * * * *